United States Patent
Matas et al.

(10) Patent No.: US 10,025,972 B2
(45) Date of Patent: Jul. 17, 2018

(54) SYSTEMS AND METHODS FOR DYNAMICALLY GENERATING EMOJIS BASED ON IMAGE ANALYSIS OF FACIAL FEATURES

(71) Applicant: Facebook, Inc., Menlo Park, CA (US)

(72) Inventors: Michael James Matas, Healdsburg, CA (US); Michael Waldman Reckhow, San Francisco, CA (US); Yaniv Taigman, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 223 days.

(21) Appl. No.: 14/942,784

(22) Filed: Nov. 16, 2015

(65) Prior Publication Data

US 2017/0140214 A1    May 18, 2017

(51) Int. Cl.
  *G06K 9/00* (2006.01)
  *G06F 17/24* (2006.01)
  *G06F 17/21* (2006.01)

(52) U.S. Cl.
  CPC ....... *G06K 9/00315* (2013.01); *G06F 17/212* (2013.01); *G06F 17/24* (2013.01); *G06K 9/00281* (2013.01); *G06K 9/00335* (2013.01)

(58) Field of Classification Search
  CPC ....... H04N 21/44008; H04N 21/44218; H04N 21/4788; H04N 1/3935
  USPC ....... 382/115, 118, 125, 128, 170, 171, 278, 382/282, 307; 340/5.81, 5.83
  See application file for complete search history.

(56) References Cited

U.S. PATENT DOCUMENTS

| | | | | |
|---|---|---|---|---|
| 7,751,599 B2 * | 7/2010 | Chen | ................... | G06K 9/00281 382/103 |
| 8,015,245 B2 * | 9/2011 | Milic-Frayling | ... | H04L 61/1547 345/473 |
| 8,170,298 B2 * | 5/2012 | Li | ....................... | G06K 9/00281 345/441 |
| 8,401,248 B1 * | 3/2013 | Moon | ................ | G06Q 30/0242 382/103 |
| 8,410,903 B2 * | 4/2013 | Hirai | ....................... | G06F 21/32 340/5.53 |
| 8,553,037 B2 * | 10/2013 | Smith | ...................... | G06T 13/40 345/473 |
| 8,584,031 B2 * | 11/2013 | Moore | ................ | G06F 3/04817 715/773 |
| 8,620,850 B2 * | 12/2013 | Brown | ................... | G06F 17/241 463/31 |
| 8,830,244 B2 * | 9/2014 | Kanemaru | ............... | G06T 13/40 345/473 |

\* cited by examiner

*Primary Examiner* — Yosef Kassa
(74) *Attorney, Agent, or Firm* — Sheppard Mullin Richter & Hampton LLP

(57) ABSTRACT

Systems, methods, and non-transitory computer-readable media can acquire real-time image data depicting at least a portion of a face of a user of a computing system (or device). The real-time image data can be analyzed to determine a state associated with at least the portion of the face. An emoji can be provided based on the state associated with at least the portion of the face. The emoji can be inputted in a communication to be made by the user.

20 Claims, 9 Drawing Sheets

SYSTEMS AND METHODS FOR DYNAMICALLY GENERATING EMOJIS BASED ON IMAGE ANALYSIS OF FACIAL FEATURES

FIELD OF THE INVENTION

The present technology relates to the field of generating input. More particularly, the present technology relates to techniques for dynamically generating emojis based on image analysis of facial features.

BACKGROUND

Today, people often utilize computing devices (or systems) for a wide variety of purposes. Users can use their computing devices to, for example, interact with one another, access content, share content, and create content. In some cases, users can utilize their computing devices to communicate, such as by publishing a post, making a comment, or sending a message. In some cases, users may desire to include an emoji (or emoticon) in their communications.

Under conventional approaches rooted in computer technology, a user often times has to manually type, touch, or click on a desired emoji in order to select and include the emoji in his or her communication. Accordingly, such conventional approaches to utilizing emojis can be inefficient or inconvenient. Moreover, under conventional approaches to utilizing emojis, an emoji is typically selected and inputted by the user using a keyboard, a mouse, and/or a touch display screen, thereby reducing the likelihood that the user experiences the meaningful feeling or emotion associated with the inputted emoji. As such, conventional approaches can create challenges for or reduce the overall user experience associated with utilizing emojis.

SUMMARY

Various embodiments of the present disclosure can include systems, methods, and non-transitory computer readable media configured to acquire real-time image data depicting at least a portion of a face of a user of a computing system. The real-time image data can be analyzed to determine a state associated with at least the portion of the face. An emoji can be provided based on the state associated with at least the portion of the face. The emoji can be inputted in a communication to be made by the user.

In an embodiment, the real-time image data can be analyzed to determine one or more positions of one or more specified facial features within at least the portion of the face of the user. One or more emoji features within the emoji that are associated with the one or more specified facial features can be identified. The one or more emoji features can be modified based on the one or more positions of the one or more specified facial features.

In an embodiment, the one or more specified facial features can include at least one of an eye of the user, an eyebrow of the user, a nose of the user, a lip of the user, a tooth of the user, a tongue of the user, or a mouth of the user.

In an embodiment, the real-time image data can be analyzed to determine that the real-time image data further depicts at least one of an object or a gesture. A graphical representation for the at least one of the object or the gesture can be selected. The graphical representation can be provided in conjunction with the emoji.

In an embodiment, analyzing the real-time image data to determine the state associated with at least the portion of the face can further comprise analyzing one or more virtual points on at least the portion of the face to identify a virtual point arrangement. The virtual point arrangement can be matched, within an allowable deviation, with a facial expression model out of a plurality of facial expression models.

In an embodiment, the emoji can be identified out of a plurality of emojis based on the facial expression model. Each of the plurality of emojis can be respectively associated with each of the plurality of facial expression models.

In an embodiment, matching the virtual point arrangement with the facial expression model can be based on at least one of a machine learning training process or a crowd-source training process.

In an embodiment, the real-time image data can be analyzed to determine a second state associated with at least the portion of the face. The emoji provided can be updated based on the second state associated with at least the portion of the face.

In an embodiment, the communication can be published as at least one of a message, a journal entry, a diary entry, a blog entry, a comment, a response, or a post.

In an embodiment, a preview of the emoji can be dynamically presented prior to inputting the emoji in the communication to be made by the user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
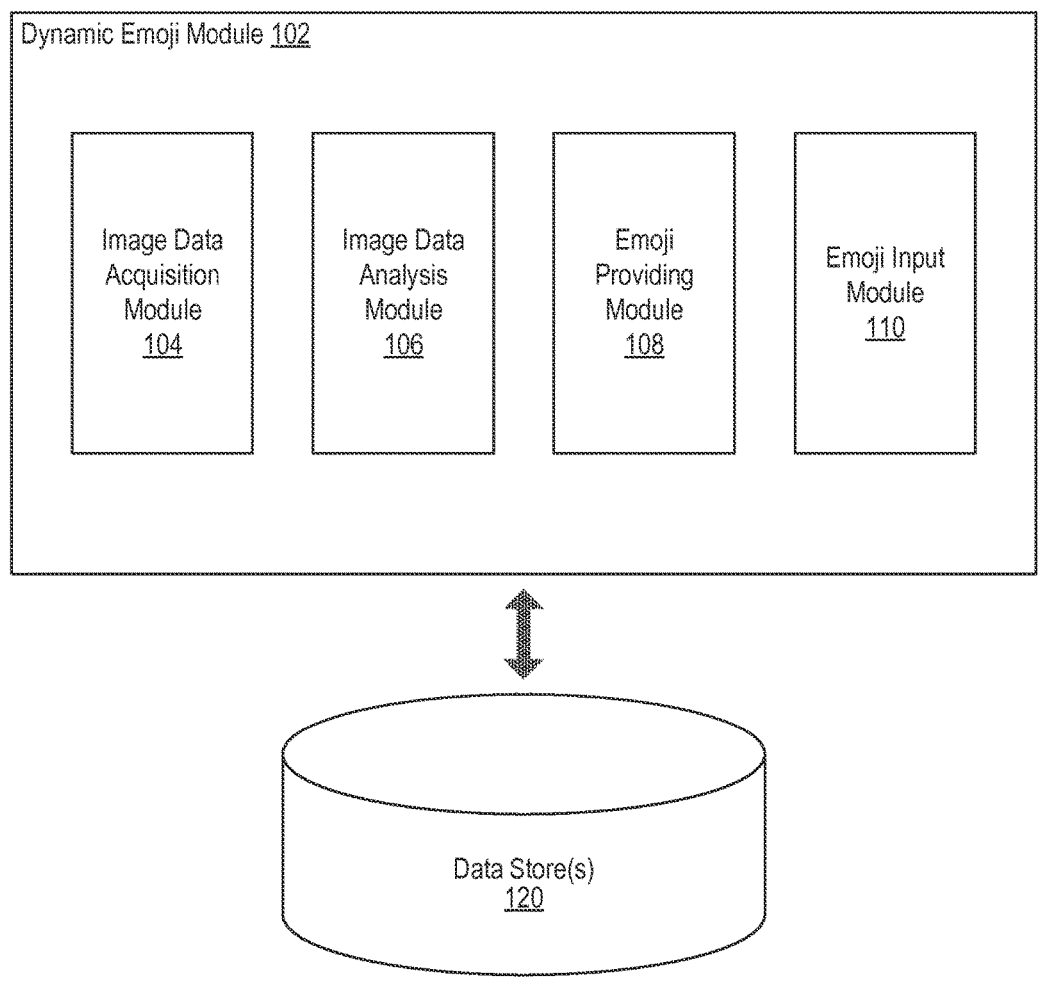
FIG. 1 illustrates an example system including an example dynamic emoji module configured to facilitate dynamically generating emojis based on image analysis of facial features, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Dynamically Generating Emojis Based on Image Analysis of Facial Features

People use computing systems (or devices) for various purposes. Users can utilize their computing systems to establish connections, communicate, and interact with one another. In one instance, a user can electronically create and publish a journal entry, a diary entry, or a blog entry. In another instance, the user can utilize a social networking system (or service) to generate a post, provide a comment, or engage in communications. In a further instance, the user can use his or her computing system to write and transmit a message, such as a text or chat message.

Often times, the user may desire to include an emoji (or emoticon, ideogram, graphical symbol, etc.) into his or her communication. Under conventional approaches, the user typically has to use a keyboard, mouse, and/or touch display to find and select a desired emoji to be inputted into the communication. However, such conventional approaches to utilizing emojis can be inefficient or inconvenient.

Furthermore, in accordance with conventional approaches, the distraction to a user caused by inputting the emoji using the keyboard, mouse, and/or touch display can increase the likelihood that the user will be detached or directed away from the feeling or emotion associated with the inputted emoji, thereby potentially decreasing the meaningfulness of the inputted emoji. Such conventional approaches can thus be undesirable and can reduce the overall experience associated with utilizing emojis.

Due to these or other concerns, conventional approaches can be disadvantageous or problematic. Therefore, an improved approach can be beneficial for addressing or alleviating various drawbacks associated with conventional approaches. Based on computer technology, the disclosed technology can dynamically generate emojis (or emoticons, ideogram, graphical symbol, etc.) based on image analysis of one or more facial features. Various embodiments of the present disclosure can acquire real-time image data depicting at least a portion of a face of a user of a computing system. The real-time image data can be analyzed to determine a state associated with at least the portion of the face. An emoji can be provided based on the state associated with at least the portion of the face. The emoji can be inputted in a communication to be made by the user. It is contemplated that there can be many variations and/or other possibilities associated with the disclosed technology.

FIG. 1 illustrates an example system 100 including an example dynamic emoji module 102 configured to facilitate dynamically generating emojis based on image analysis of facial features, according to an embodiment of the present disclosure. As shown in the example of FIG. 1, the dynamic emoji module 102 can include an image data acquisition module 104, an image data analysis module 106, an emoji providing module 108, and an emoji input module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the dynamic emoji module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the dynamic emoji module 102 can be implemented, in part or in whole, as software running on one or more computing devices or systems, such as on a user or client computing device. For example, the dynamic emoji module 102 or at least a portion thereof can be implemented as or within an application (e.g., app), a program, an applet, or an operating system, etc., running on a user computing device or a client computing system, such as the user device 710 of FIG. 7. In another example, the dynamic emoji module 102 or at least a portion thereof can be implemented using one or more computing devices or systems that include one or more servers, such as network servers or cloud servers. In some instances, the dynamic emoji module 102 can, in part or in whole, be implemented within or configured to operate in conjunction with a social networking system (or service), such as the social networking system 730 of FIG. 7. It should be understood that there can be many variations or other possibilities.

The image data acquisition module 104 can be configured to facilitate acquiring real-time image data depicting at least a portion of a face of a user of the computing system (or device), such as the user device 710. The image data acquisition module 104 can, for instance, be configured to operate or work in conjunction with a camera of the computing system. Image data can be acquired by the image data acquisition module 104 via the camera. In some cases, image data can correspond to information representing an image, a video (e.g., one or more video image frames), and/or other visualizations. In some cases, the real-time image data can be associated with a real-time camera view of the camera.

As discussed, the real-time image data can depict, include, or represent a face (or at least a facial portion) of a user of the computing system. In some implementations, when the user initiates a command or an instruction, the image data acquisition module 104 can initiate acquisition of the image data in (or near) real-time. Accordingly, if the appearance of the face (or at least the facial portion) changes, the real-time image data can include, depict, or represent those changes as they occur. For instance, if the user changes his or her facial expression, the real-time image data can include, depict, or represent those changes in facial expression as they occur (or within an allowable time deviation from when they occur).

Moreover, the image data analysis module 106 can be configured to facilitate analyzing the real-time image data to determine a state associated with at least the portion of the face. For instance, the image data analysis module 106 can analyze the real-time image data to dynamically determine (e.g., in or near real-time) whether the face (or at least the portion thereof) corresponds to a happy state, a sad state, a mad state, etc. Many variations are possible. More details regarding the image data analysis module 106 will be provided below with reference to FIG. 2A.

The emoji providing module 108 can be configured to facilitate providing an emoji based on the state associated with at least the portion of the face. For example, the emoji providing module 108 can determine, identify, or select an emoji that corresponds to or is associated with the state. In some cases, the user can change the state by changing his or her facial expression. This can cause the emoji providing module 108 to provide a corresponding emoji based on the changed state. Accordingly, the user can cause the emoji to be selected based on his or her facial expression, and by doing so, the likelihood that the user experiences the feeling or emotion associated with the emoji increases. This can produce a more meaningful or significant experience for utilizing emojis. The emoji providing module 108 will be discussed in more detail below with reference to FIG. 2B.

Additionally, the emoji input module 110 can be configured to facilitate inputting the emoji in a communication to be made by the user. In some cases, the emoji can be provided for input into the communication by the user without the use of a keyboard, a mouse, or a touch gesture (e.g., a tap, a press, a hold, etc.). For example, the user can provide a facial expression to select a desired emoji to be provided as input. The user can also change his or her facial expression to change the selection of the desired emoji to be inputted in the communication. It is contemplated that many variations are possible.

In some embodiments, the emoji input module 110 can be further configured to facilitate publishing the communication as at least one of a message, a journal entry, a diary entry, a blog entry, a comment, a response, or a post, etc. In one example, a user can comment or reply to a post within a social networking system. The user can submit a command to initiate the acquisition of image data in (or near) real time. In this example, a front facing camera of a computing device of the user can capture or acquire real-time image data. The user can provide a facial expression to be included, depicted, or represented in the image data acquired or captured using the front facing camera. Based on the facial expression (or other state of the user's face), a corresponding emoji can be selected, identified, or provided as input for the comment or reply to the post. If, for example, the user gives a happy facial expression, a happy face emoji can be provided. If, for example, the user gives a sad facial expression, a sad face emoji can be provided. It should be understood that all examples herein are provided for illustrative purposes and that many variations are possible.

Furthermore, in some embodiments, the dynamic emoji module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the dynamic emoji module 102. Again, it is contemplated that there can be many variations or other possibilities.

Figure 2A:
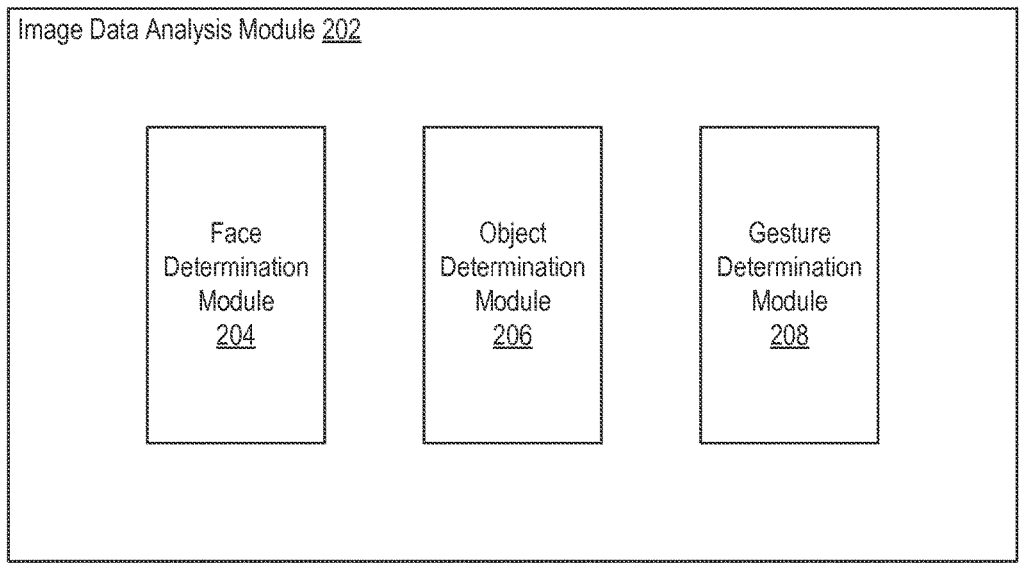
FIG. 2A illustrates an example image data analysis module configured to facilitate dynamically generating emojis based on image analysis of facial features, according to an embodiment of the present disclosure.

FIG. 2A illustrates an example image data analysis module 202 configured to facilitate dynamically generating emojis based on image analysis of facial features, according to an embodiment of the present disclosure. In some embodiments, the image data analysis module 106 of FIG. 1 can be implemented as the example image data analysis module 202. As shown in FIG. 2A, the image data analysis module 202 can include a face determination module 204, an object determination module 206, and a gesture determination module 208.

As discussed previously, the image data analysis module 202 can be configured to facilitate analyzing real-time image data to determine a state associated with a face (or at least a portion thereof). The image data analysis module 202 can utilize the face determination module 204 to facilitate analyzing the real-time image data to determine the state associated with the face. Also, in some embodiments, the real-time image data can be analyzed dynamically and/or in (or near) real-time such that the determined state can correspond to a current, or near current (within an allowable time deviation), representation of the user's facial expression. For example, the face determination module 204 can dynamically determine whether the user's face is currently in a happy state (e.g., smiling), a sad state (e.g., frowning), a surprised state (e.g., raised eyebrows), an angry state (e.g., eyebrows squeezed together), and so forth. Further, in some implementations, machine learning and/or crowd sourcing can be utilized to train computer vision and/or image processing techniques utilized by the face determination module 204 to analyze the real-time image data. In some embodiments, supervised and/or unsupervised training processes can be utilized. It is contemplated that many variations are possible.

In some implementations, the face determination module 204 can analyze the real-time image data to determine the state associated with at least the portion of the face by analyzing one or more virtual points (e.g., representing the tip of the nose, the corners of the eyes, the tops of the eyes, the bottoms of the eyes, the corners of the mouth, etc.) on at least the portion of the face to identify a virtual point arrangement. The face determination module 204 can further match, within an allowable deviation, the virtual point arrangement with a facial expression model out of a plurality of facial expression models. The emoji can be identified out of a plurality of emojis based on the facial expression model. Each of the plurality of emojis can be respectively associated with each of the plurality of facial expression models. In some cases, matching the virtual point arrangement with the facial expression model can be based on at least one of a machine learning training process or a crowdsource training process. Again, there can be many variations or other possibilities.

Moreover, in some embodiments, the face determination module 204 can be configured to further analyze the real-time image data to determine (dynamically and/or in real-time) one or more positions of one or more specified facial features within the user's face (or at least a portion thereof). In some cases, it can be preset or predefined that the one or more specified facial features include at least one of an eye of the user, an eyebrow of the user, a nose of the user, a lip of the user, a tooth of the user, a tongue of the user, or a mouth of the user, etc. For example, the face determination module 204 can analyze the real-time data to determine positions (e.g., locations within the face, orientations, sizes, etc.) of the user's eyebrows, the user's lips (and thus the size of the user's mouth), the user's tongue (e.g., whether and how the user is sticking out his or her tongue), and so forth. One or more emoji features within the emoji that are associated with the specified facial features can be identified. Based on the one or more positions of the one or more specified facial features, the one or more emoji features can be modified.

Furthermore, the object determination module 206 can be configured to analyze the real-time image data to determine (dynamically and/or in real-time) that the real-time image data further depicts an object. In one instance, the user can hold a soda can such that the soda can is included, represented, or depicted in the image data, and the object determination module 206 can then determine, recognize, or identify the soda can. In another instance, the user can wear a hat such that the object determination module 206 can determine, recognize, or identify the hat. Accordingly, a graphical representation for the object can be selected and the graphical representation can be presented in conjunction with or at a same time as the emoji.

Additionally, the gesture determination module 208 can be configured to analyze the real-time image data to determine (dynamically and/or in real-time) that the real-time image data further depicts a gesture (or action). In one instance, the user can use his or her hand to make a peace sign to be included, represented, or depicted in the image data, and the gesture determination module 208 can then determine, recognize, or identify the peace sign. In another instance, the user can perform a hugging action such that the gesture determination module 208 can determine, recognize, or identify the hugging action. Subsequently, a graphical representation for the gesture can be selected and the graphical representation can be presented in conjunction or simultaneously with the emoji.

Figure 2B:
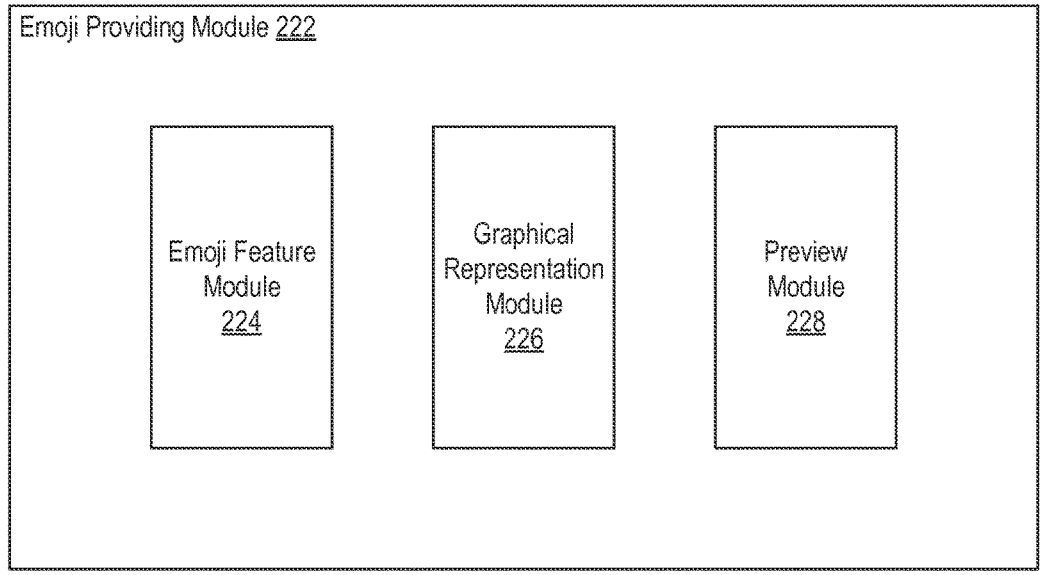
FIG. 2B illustrates an example emoji providing module configured to facilitate dynamically generating emojis based on image analysis of facial features, according to an embodiment of the present disclosure.

FIG. 2B illustrates an example emoji providing module 222 configured to facilitate dynamically generating emojis based on image analysis of facial features, according to an embodiment of the present disclosure. In some embodiments, the emoji providing module 108 of FIG. 1 can be implemented as the example emoji providing module 222. As shown in FIG. 2B, the emoji providing module 222 can include an emoji feature module 224, a graphical representation module 226, and a preview module 228.

As discussed above, the emoji providing module 222 can facilitate providing an emoji based on a state associated with at least a portion of a user's face. In some embodiments, the emoji providing module 222 can provide the emoji as a static emoji or as an animated emoji. In some embodiments, the emoji providing module 222 can provide the emoji dynamically and/or in real-time. For example, if the state of the user's face currently corresponds to a happy facial expression, then the emoji providing module 222 can provide a smiley face emoji. In another example, if the state of the user's face currently corresponds to a sad facial expression, then the emoji providing module 222 can provide a sad face emoji. Again, it should be appreciated that all examples herein are provided for illustrative purposes and that there can be many variations.

In some embodiments, as discussed above, analyzing the real-time image data to determine the state associated with at least the portion of the user's face can further comprise analyzing one or more virtual points on at least the portion of the user's face to identify a virtual point arrangement. The virtual point arrangement can be matched, within an allowable deviation, with a facial expression model out of a plurality of facial expression models. The emoji providing module 222 can identify the emoji out of a plurality of emojis based on the matched facial expression model. Each of the plurality of emojis can be respectively associated with each of the plurality of facial expression models.

Additionally, in some cases, the emoji feature module 224 can provide the emoji with one or more personalized features. For instance, real-time image data can be analyzed to determine one or more positions of one or more specified facial features within the user's face or at least a portion thereof, as discussed previously. The emoji feature module 224 can identify one or more emoji features within the emoji that are associated with or representative of the one or more specified facial features. The emoji feature module 224 can also modify the one or more emoji features based on the one or more positions of the one or more specified facial features. For example, the positions (e.g., locations, orientations, sizes, lengths, widths, etc.) of the user's eyebrows within the user's face can be determined. In this example, the emoji feature module 224 can identify emoji eyebrow features, which can be used to represent the user's eyebrows. The emoji feature module 224 can place or render the emoji eyebrow features within the emoji. Many variations are possible.

Furthermore, as discussed above, real-time image data can be analyzed to determine that the image data further depicts at least one of an object or a gesture. The graphical representation module 226 can select a graphical representation for the at least one of the object or the gesture. The graphical representation can correspond to an emoji element that represents or illustrates the object and/or the gesture in emoji form. The graphical representation module 226 can then provide the graphical representation in conjunction with the emoji. In one example, if the user holds a product with Brand A that is captured in the image data, the graphical representation module 226 can render a graphical representation of the product with Brand A in emoji form (when an entity associated with Brand A has made arrangements to allow the product with Brand A to be rendered). In another example, if the user holds the product with Brand A that is captured in the image data, the graphical representation module 226 can render a graphical representation of a generic version of the product. In a further example, if the user makes a thumbs-up gesture, the graphical representation module 226 can render a graphical representation of the thumbs-up gesture in emoji form. It should be understood that many variations are possible.

Moreover, in some implementations, the preview module 228 can dynamically present a preview of the emoji prior to inputting the emoji in a communication to be made by the user. For instance, the user can desire to make a communication using the emoji. With his or her facial expression, the user can cause the emoji to be selected and inputted. The preview module 228 can render the preview of the emoji in (or near) real-time and/or dynamically, such that the preview of the emoji can illustrate the current facial expression of the user. Any changes in facial expression made by the user can cause the preview of the emoji to change accordingly. Again, many variations are possible.

Figure 3:
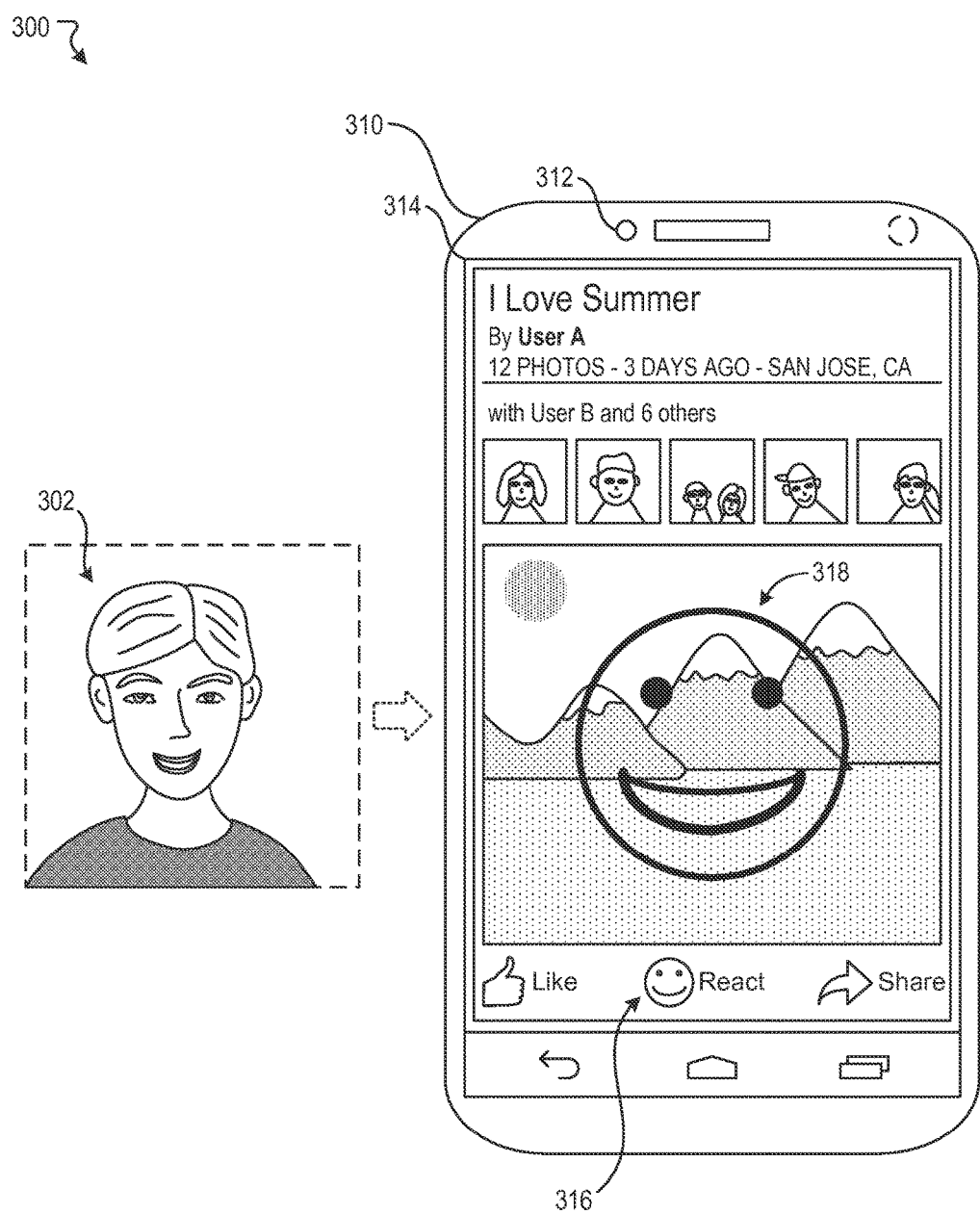
FIG. 3 illustrates an example scenario associated with dynamically generating emojis based on image analysis of facial features, according to an embodiment of the present disclosure.

FIG. 3 illustrates an example scenario 300 associated with dynamically generating emojis based on image analysis of facial features, according to an embodiment of the present disclosure. In the example scenario 300 of FIG. 3, there can be a user 302 and a computing device 310. The computing device 310 can include a front facing camera 312 and a display element 314. As shown, the display element 314 can present an interface for providing content within a social networking system.

Moreover, in the example scenario 300, the disclosed technology can provide an interactive element (e.g., a button) 316 for initiating dynamic generation of emojis based on image analysis of facial features. In this example, the user 302 can tap on the interactive element 316 and cause the front facing camera 312 to start acquiring image data in (or near) real time. The acquired real-time image data can include, depict, or represent at least a portion of the face of the user 302. The real-time image data can be analyzed to determine a state associated with at least the portion of the face. The user 302 can interact with the interactive element 316 to cause the disclosed technology to provide an emoji 318 based on the state associated with at least the portion of the face. In this example, the user 302 can tap on the interactive element 316 to cause a static emoji to be provided, or press and hold the interactive element 316 to cause an animated/video emoji to be provided. The provided emoji 318 (or a smaller version thereof) can then be inputted in a communication to be made by the user 302. In this example scenario 300, the emoji 318 can be inputted into a reaction or a response to a content item posted via the social networking system. Many variations are possible.

Figure 4:
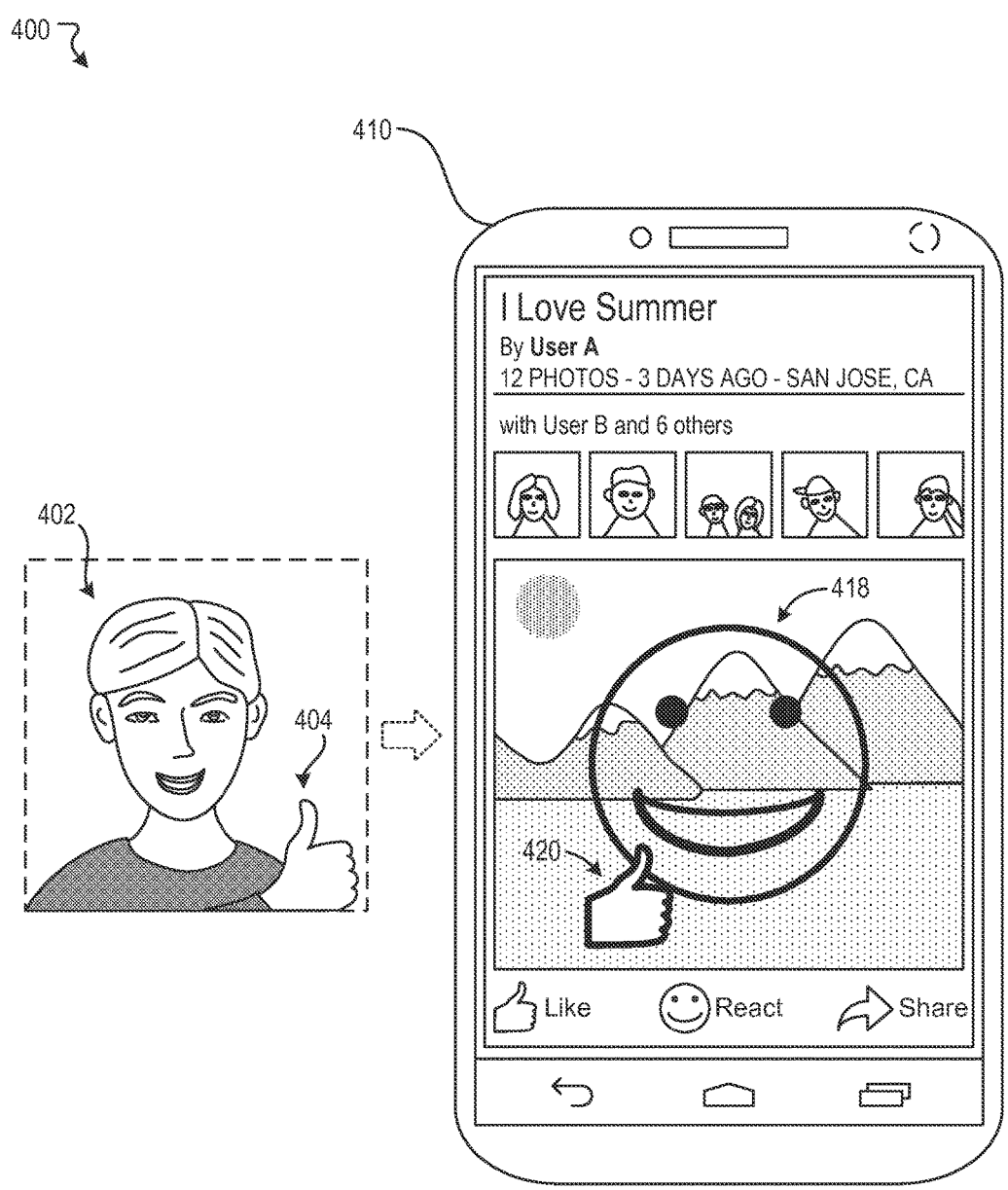
FIG. 4 illustrates an example scenario associated with dynamically generating emojis based on image analysis of facial features and other gestures, according to an embodiment of the present disclosure.

FIG. 4 illustrates an example scenario 400 associated with dynamically generating emojis based on image analysis of facial features and other gestures, according to an embodiment of the present disclosure. As shown in the example scenario 400 of FIG. 4, there can be a user 402 and a computing device 410, such as the user 302 and the computing device 310 of FIG. 3. In the example scenario 400 of FIG. 4, the disclosed technology can provide an emoji 418 based on a state associated with at least a portion of the face of the user 402. In this example, the user 402 has further made a gesture, such as a thumbs-up gesture 404. The disclosed technology can analyze the real-time image data to determine that the real-time image data depicts the thumbs-up gesture 404. The disclosed technology can select a graphical representation 420 for the gesture 404. The graphical representation can be provided in conjunction with the emoji. It should be understood that many variations are possible.

Figure 5:
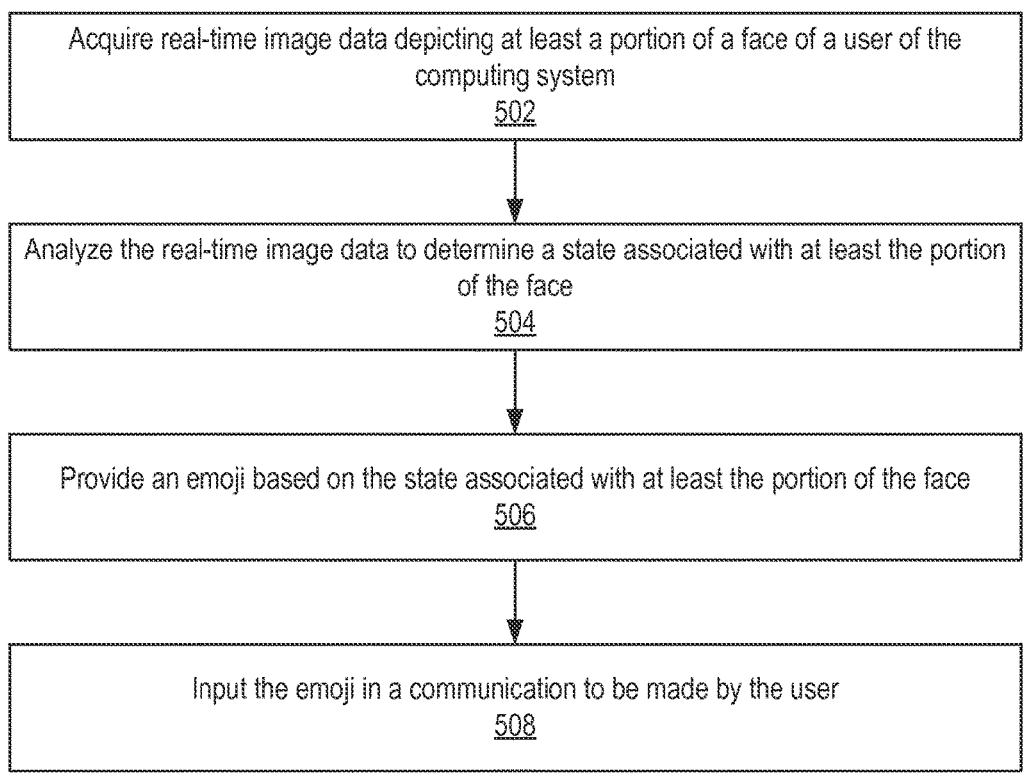
FIG. 5 illustrates an example method associated with dynamically generating emojis based on image analysis of facial features, according to an embodiment of the present disclosure.

FIG. 5 illustrates an example method 500 associated with dynamically generating emojis based on image analysis of facial features, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can acquire real-time image data depicting at least a portion of a face of a user of a computing system. At block 504, the example method 500 can analyze the real-time image data to determine a state associated with at least the portion of the face. At block 506, the example method 500 can provide an emoji based on the state associated with at least the portion of the face. At block 508, the example method 500 can input the emoji in a communication to be made by the user.

Figure 6:
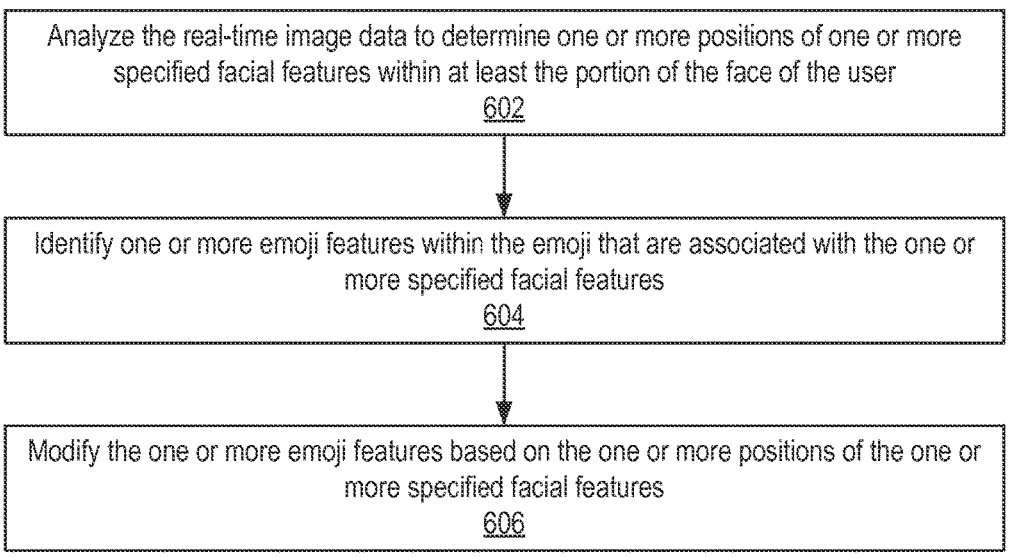
FIG. 6 illustrates an example method associated with dynamically generating emojis based on image analysis of facial features, according to an embodiment of the present disclosure.

FIG. 6 illustrates an example method 600 associated with dynamically generating emojis based on image analysis of facial features, according to an embodiment of the present disclosure. As discussed, it should be understood that there can be additional, fewer, or alternative steps performed in similar or alternative orders, or in parallel, within the scope of the various embodiments unless otherwise stated.

At block 602, the example method 600 can analyze the real-time image data to determine one or more positions of one or more specified facial features within at least the portion of the face of the user. At block 604, the example method 600 can identify one or more emoji features within the emoji that are associated with the one or more specified facial features. At block 606, the example method 600 can modify the one or more emoji features based on the one or more positions of the one or more specified facial features.

It is contemplated that there can be many other uses, applications, features, possibilities, and/or variations associated with the various embodiments of the present disclosure. For example, in some instances, the disclosed technology can analyze the real-time image data to determine a second state associated with at least the portion of the face. The disclosed technology can also update, based on the second state associated with at least the portion of the face, the emoji provided. The disclosed technology can further provide one or more animations between the initial emoji associated with the first state and the updated emoji associated with the second state. Additionally, in some cases, users can choose whether or not to opt-in to utilize the disclosed technology. The disclosed technology can, for instance, also ensure that various privacy settings and preferences are maintained and can prevent private information from being divulged. In another example, various embodiments of the present disclosure can learn, improve, and/or be refined over time.

Social Networking System—Example Implementation

Figure 7:
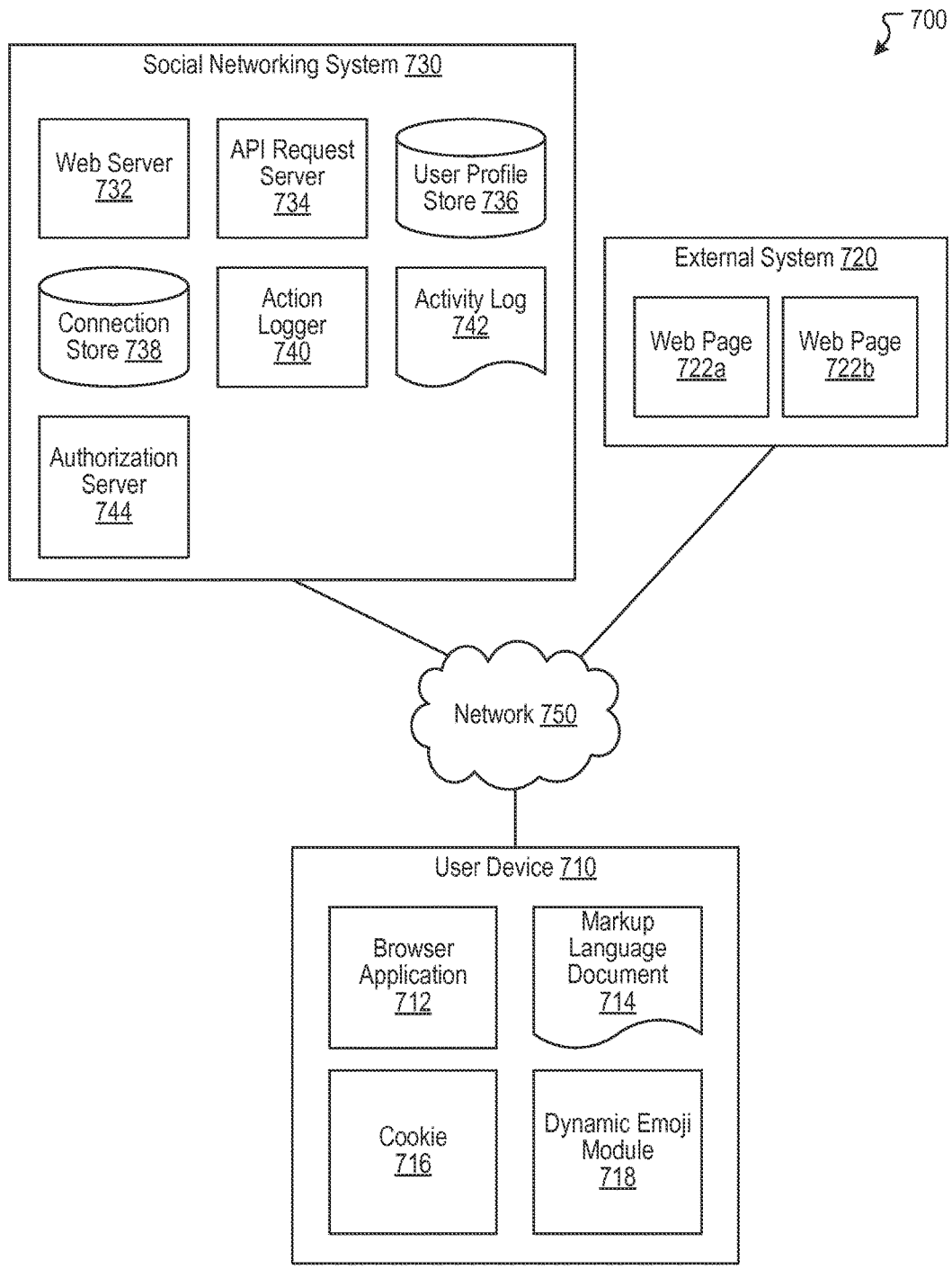
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include a dynamic emoji module 718. The dynamic emoji module 718 can, for example, be implemented as the dynamic emoji module 102 of FIG. 1. As discussed previously, it should be appreciated that there can be many variations or other possibilities. For example, in some instances, the dynamic emoji module (or at least a portion thereof) can be included or implemented in the social networking system 730. Other features of the dynamic emoji module 718 are discussed herein in connection with the dynamic emoji module 102.

Hardware Implementation

Figure 8:
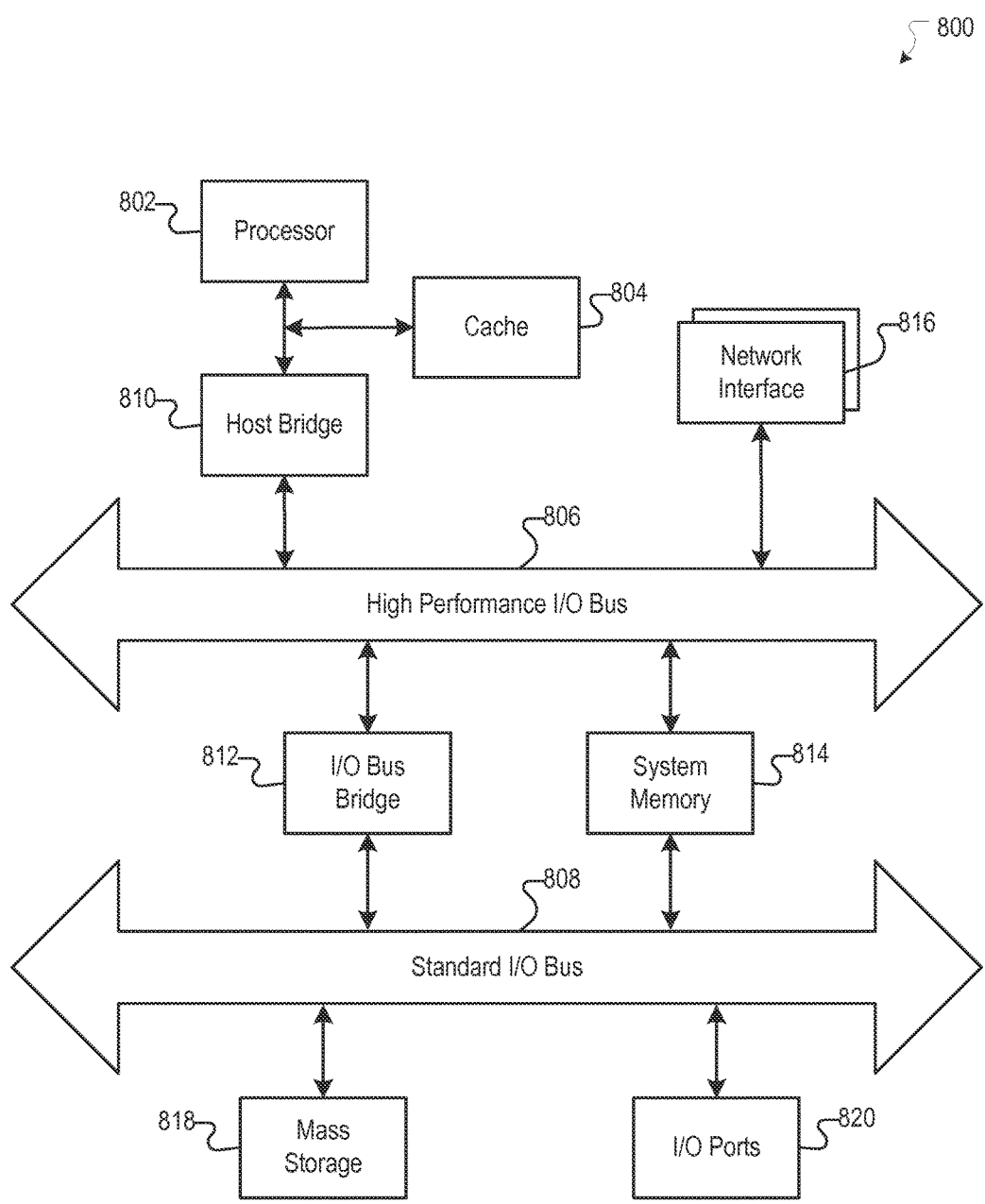
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    acquiring, by a computing system, real-time image data depicting at least a portion of a face of a user of the computing system;
    analyzing, by the computing system, the real-time image data to determine a state associated with at least the portion of the face;
    providing, by the computing system, an emoji based on the state associated with at least the portion of the face; and
    inputting, by the computing system, the emoji based on the state associated with at least the portion of the face in a communication to be made by the user.

2. The computer-implemented method of claim 1, further comprising:
    analyzing the real-time image data to determine one or more positions of one or more specified facial features within at least the portion of the face of the user;
    identifying one or more emoji features within the emoji that are associated with the one or more specified facial features; and
    modifying the one or more emoji features based on the one or more positions of the one or more specified facial features.

3. The computer-implemented method of claim 2, wherein the one or more specified facial features include at least one of an eye of the user, an eyebrow of the user, a nose of the user, a lip of the user, a tooth of the user, a tongue of the user, or a mouth of the user.

4. The computer-implemented method of claim 1, further comprising:
    analyzing the real-time image data to determine that the real-time image data further depicts at least one of an object or a gesture;
    selecting a graphical representation for the at least one of the object or the gesture; and providing the graphical representation in conjunction with the emoji.

5. The computer-implemented method of claim 1, wherein analyzing the real-time image data to determine the state associated with at least the portion of the face further comprises:
analyzing one or more virtual points on at least the portion of the face to identify a virtual point arrangement; and
matching, within an allowable deviation, the virtual point arrangement with a facial expression model out of a plurality of facial expression models.

6. The computer-implemented method of claim 5, further comprising:
identifying the emoji out of a plurality of emojis based on the facial expression model, wherein each of the plurality of emojis is respectively associated with each of the plurality of facial expression models.

7. The computer-implemented method of claim 5, wherein matching the virtual point arrangement with the facial expression model is based on at least one of a machine learning training process or a crowdsource training process.

8. The computer-implemented method of claim 1, further comprising:
analyzing the real-time image data to determine a second state associated with at least the portion of the face; and
updating, based on the second state associated with at least the portion of the face, the emoji provided.

9. The computer-implemented method of claim 1, further comprising:
publishing the communication as at least one of a message, a journal entry, a diary entry, a blog entry, a comment, a response, or a post.

10. The computer-implemented method of claim 1, further comprising:
dynamically presenting a preview of the emoji prior to inputting the emoji in the communication to be made by the user.

11. A system comprising:
at least one processor; and
a memory storing instructions that, when executed by the at least one processor, cause the system to perform:
acquiring real-time image data depicting at least a portion of a face of a user of the system;
analyzing the real-time image data to determine a state associated with at least the portion of the face;
providing an emoji based on the state associated with at least the portion of the face; and
inputting the emoji based on the state associated with at least the portion of the face in a communication to be made by the user.

12. The system of claim 11, wherein the instructions cause the system to further perform:
analyzing the real-time image data to determine one or more positions of one or more specified facial features within at least the portion of the face of the user;
identifying one or more emoji features within the emoji that are associated with the one or more specified facial features; and
modifying the one or more emoji features based on the one or more positions of the one or more specified facial features.

13. The system of claim 12, wherein the one or more specified facial features include at least one of an eye of the user, an eyebrow of the user, a nose of the user, a lip of the user, a tooth of the user, a tongue of the user, or a mouth of the user.

14. The system of claim 11, wherein the instructions cause the system to further perform:
analyzing the real-time image data to determine that the real-time image data further depicts at least one of an object or a gesture;
selecting a graphical representation for the at least one of the object or the gesture; and
providing the graphical representation in conjunction with the emoji.

15. The system of claim 11, wherein analyzing the real-time image data to determine the state associated with at least the portion of the face further comprises:
analyzing one or more virtual points on at least the portion of the face to identify a virtual point arrangement; and
matching, within an allowable deviation, the virtual point arrangement with a facial expression model out of a plurality of facial expression models.

16. A non-transitory computer-readable storage medium including instructions that, when executed by at least one processor of a computing system, cause the computing system to perform a method comprising:
acquiring real-time image data depicting at least a portion of a face of a user of the computing system;
analyzing the real-time image data to determine a state associated with at least the portion of the face;
providing an emoji based on the state associated with at least the portion of the face; and
inputting the emoji based on the state associated with at least the portion of the face in a communication to be made by the user.

17. The non-transitory computer-readable storage medium of claim 16, wherein the instructions cause the computing system to further perform:
analyzing the real-time image data to determine one or more positions of one or more specified facial features within at least the portion of the face of the user;
identifying one or more emoji features within the emoji that are associated with the one or more specified facial features; and
modifying the one or more emoji features based on the one or more positions of the one or more specified facial features.

18. The non-transitory computer-readable storage medium of claim 17, wherein the one or more specified facial features include at least one of an eye of the user, an eyebrow of the user, a nose of the user, a lip of the user, a tooth of the user, a tongue of the user, or a mouth of the user.

19. The non-transitory computer-readable storage medium of claim 16, wherein the instructions cause the computing system to further perform:
analyzing the real-time image data to determine that the real-time image data further depicts at least one of an object or a gesture;
selecting a graphical representation for the at least one of the object or the gesture; and
providing the graphical representation in conjunction with the emoji.

20. The non-transitory computer-readable storage medium of claim 16, wherein analyzing the real-time image data to determine the state associated with at least the portion of the face further comprises:
analyzing one or more virtual points on at least the portion of the face to identify a virtual point arrangement; and
matching, within an allowable deviation, the virtual point arrangement with a facial expression model out of a plurality of facial expression models.

* * * * *